(12) United States Patent
Serebryanov et al.

(10) Patent No.: US 8,503,497 B2
(45) Date of Patent: Aug. 6, 2013

(54) PROTECTION DEVICE FOR SOLID STATE LASER

(75) Inventors: Oleg Serebryanov, San Jose, CA (US); Alexander Goldin, San Jose, CA (US); Abhilash J. Mayur, Salinas, CA (US); Leonid M. Tertitski, Los Gatos, CA (US)

(73) Assignee: Applied Materials, Inc., Santa Clara, CA (US)

( * ) Notice: Subject to any disclaimer, the term of this patent is extended or adjusted under 35 U.S.C. 154(b) by 107 days.

(21) Appl. No.: 13/323,278

(22) Filed: Dec. 12, 2011

(65) Prior Publication Data

US 2012/0170603 A1 Jul. 5, 2012

Related U.S. Application Data

(60) Provisional application No. 61/428,752, filed on Dec. 30, 2010.

(51) Int. Cl.
*H01S 3/00* (2006.01)
(52) U.S. Cl.
USPC ................................ 372/38.09; 372/38.02
(58) Field of Classification Search
USPC .......................................... 372/38.02, 38.09
See application file for complete search history.

(56) References Cited

U.S. PATENT DOCUMENTS

| 6,091,749 A | 7/2000 | Hoffmaster et al. |
| 7,135,423 B2 | 11/2006 | Downey |

FOREIGN PATENT DOCUMENTS

| JP | 2001-297466 A | 10/2001 |
| KR | 10-0169551 B1 | 1/1999 |
| KR | 10-2001-0081429 A | 8/2001 |
| KR | 10-2009-0091118 A | 8/2009 |

OTHER PUBLICATIONS

International Search Report and Written Opinion for International Application No. PCT/US2011/064462 dated Jul. 25, 2012.

*Primary Examiner* — Armando Rodriguez
(74) *Attorney, Agent, or Firm* — Patterson & Sheridan, LLP

(57) ABSTRACT

Embodiments provide systems, devices, and methods for controlling a laser. The system includes a controller to control a laser, a ramp generator to ramp down laser power, the ramp generator electrically coupled with the controller and coupleable with the laser, and a hardware protection system electrically coupled with the ramp generator, wherein the ramp generator monitors signals sent from the controller and the hardware protection system to the ramp generator to detect signal failure and ramps down the laser power upon signal failure detection. The method includes sending a control status signal from a controller for a laser to a ramp generator, monitoring the control status signal for missing pulses, sending a hardware interlock status signal from a hardware protection system to the ramp generator, monitoring the hardware interlock status signal for signal failure, and ramping down laser power upon detection of missing pulses or signal failure.

20 Claims, 3 Drawing Sheets

PROTECTION DEVICE FOR SOLID STATE LASER

CROSS-REFERENCE TO RELATED APPLICATIONS

This application claims benefit of U.S. Provisional Application No. 61/428,752, filed Dec. 30, 2010, which is incorporated by reference.

BACKGROUND OF THE INVENTION

1. Field of the Invention

Embodiments of the present invention generally relate to control of solid state lasers. More particularly, embodiments of the present invention relate to methods for shutting down solid state lasers during abnormal events.

2. Description of the Related Art

Solid state lasers have many applications in a variety of fields. For example, solid state lasers may be used during substrate processing for manufacture of integrated circuit devices, thin-film-transistor devices, flexible substrate applications, organic light emitting diodes, and solar cell devices. One application of solid state lasers is for rapid thermal annealing of a substrate during the manufacturing process of various devices.

FIG. 1 illustrates a schematic diagram of a laser based annealing system for substrate processing. The laser based substrate annealing system includes a system controller 10, a laser power supply 12, a laser 13 including the laser housing body and components within the housing body necessary to create a laser beam 14, and a hardware protection system 16. The laser based annealing system may be used to anneal a substrate 15 or portions thereof using a laser beam 14. The system controller 10 generates a control signal 17 to set the output current or power of the laser power supply 12 with laser current control signal 9. By changing the operating current or power for laser 13, the controller sets the energy of the laser beam 14, and therefore the annealing temperature of the substrate 15.

If during wafer processing a system malfunction occurs, a hardware protection system 16 turns off the laser power supply 12 by changing the status of interlock signal 18 from ON to OFF. Removing interlock signal 18 from laser power supply 12 abruptly sets the laser current signal 9, and thus the laser power, to zero. Since the laser temperature depends on the output power of the laser power supply, the temperature of the laser also changes from an operation level to an idle level. Fast temperature changes may create thermal stresses in the laser, which are known to cause structure defects inside the laser housing body.

Lasers can also be damaged if the laser controller malfunctions. A malfunction of system controller 10 may abruptly turn off the laser power supply 12. Hence, this type of event may also create thermal stresses in the laser housing body.

Other fields may also use solid state lasers during manufacturing or other processes, such as repair and testing. While using solid state lasers, such as high power solid state lasers, during such processes, unplanned and abnormal events may occur with the processing system, causing the laser controllers to stop functioning and prematurely shutting down. Instantaneous shut down of the solid state lasers may cause thermal stresses on laser components, resulting in internal defects that may lead to reduced efficiency or inoperability of the laser. Accumulation of these internal defects prior to inoperability degrades the laser efficiency and requires revision of process recipes.

Therefore, there is a need to improve control of power variation of solid state lasers during unplanned and abnormal events to reduce and/or prevent thermal stresses on laser components, resulting in internal defects that may lead to reduced laser efficiency and inoperability.

SUMMARY OF THE INVENTION

Embodiments of the invention generally provide systems, devices, and methods for controlling a laser. In one embodiment, the system includes a controller to control a laser, a ramp generator to ramp down power to the laser, the ramp generator electrically coupled with the controller and coupleable with the laser, and a hardware protection system electrically coupled with the ramp generator, wherein the ramp generator monitors signals sent from the controller and the hardware protection system to the ramp generator to detect signal failure and ramps down the power to the laser upon signal failure detection.

In one embodiment, the method includes sending a control status signal from a controller for a laser to a ramp generator, monitoring the control status signal for missing pulses, sending a hardware interlock status signal from a hardware protection system to the ramp generator, monitoring the hardware interlock status signal for signal failure, and ramping down power to the laser upon detection of missing pulses or signal failure.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide improved control of solid state lasers during unplanned and abnormal events that cause premature shut down of the laser system. Reliability of high power solid state lasers may depend in part on thermal stresses introduced during fast, uncontrollable power variation. Uncontrolled power variation usually happens due to loss of power or control. Thermal stresses may create structure defects, such as cracks, in the laser body. Accumulated defects during uncontrollable power variation caused by abnormal or other types of events degrade laser efficiency and life time.

Embodiments of the invention detect events that may cause uncontrolled power variation and provide a controlled ramp down of the laser at a controllable speed defined by the laser specification. Abnormal events may include shutdown of system controllers, loss of control of the laser, or power sag during processing.

Figure 2:
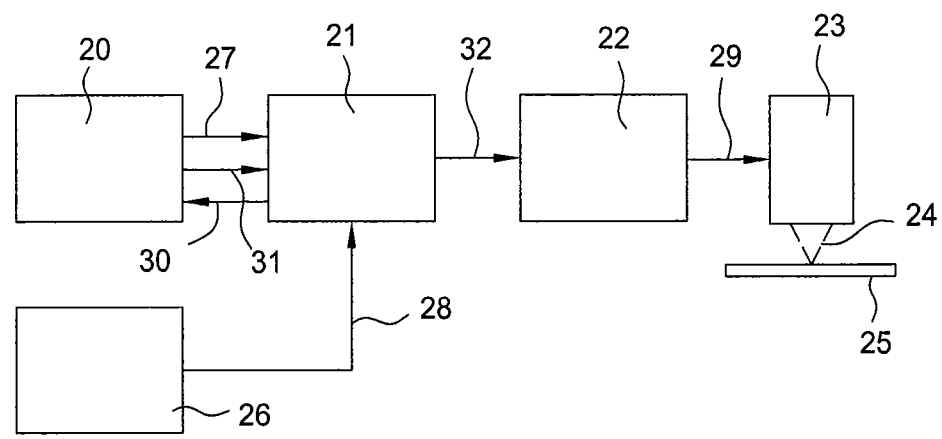
FIG. 2 is a schematic diagram of a laser based annealing system according to an embodiment of the invention.

FIG. 2 illustrates a schematic diagram of a laser based substrate annealing system, including a monitoring system according to embodiments of the invention. The laser based annealing system includes a laser 23 and a monitoring system that may include a system controller 20, a hardware protection system 26, a ramp generator 21, and a laser power supply 22. The laser 23 includes a laser housing body and components within the housing body necessary to create a laser beam 24 that may be used to anneal substrate 25.

The controller 20 generates two signals: a laser power control signal 27, which provides the current set point of the laser power supply 22, and a controller status signal 31, which provides a control status of the controller 20. Thus, controller status signal 31 provides a confirmation of the proper functionality of controller 20. This may be a signal with predefined amplitude and frequency. The ramp generator 21 also provides a ramp generator status signal 30 to the system controller 20.

The ramp generator 21 analyzes the controller status signal 31 and hardware interlock status signal 28. If both the controller status signal 31 and the hardware interlock status signal 28 are presented, the ramp generator passes the laser power control signal 27 to the ramp generator output signal 32 going to the laser power supply 22 without changes.

The working control program of ramp generator 21 is as follows: IF (controller status signal 31=TRUE) AND (hardware interlock status signal 28=TRUE) THEN the value of ramp generator output signal 32 is equal to the value of laser power control signal 27 (an input signal) and the value of the ramp generator status signal 30 is 1. If the any of signals 31 or 28≠0 TRUE, then the ramp generator 21 ramps down the value of ramp generator output signal 32 to zero with predefined speed, thereby ramping down power to the laser, and the value of the ramp generator status signal 30 is 0.

Figure 1:
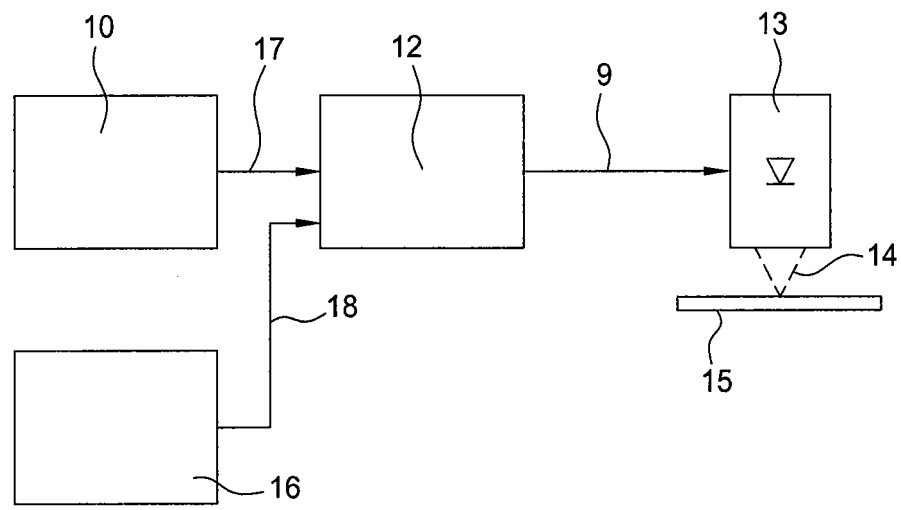
FIG. 1 is a schematic diagram of a laser based annealing system.
Figure 3:
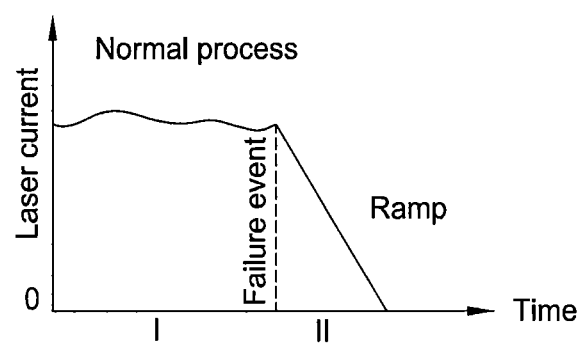
FIG. 3 is illustrates a graph representing the laser current versus time during normal processes and ramping down during a failure event.

In normal conditions, the ramp generator output signal 32 which provides the laser power supply set point is the same as the laser power control signal (controller output) 27. Laser current signal 29 is proportional to the controller set point signal (laser power control signal) 27, and the system is functioning as shown in FIG. 1, i.e. the laser power control signal 27 controls the power supply current as if the ramp generator 21 is not a component of the system. Region I of the graph shown in FIG. 3 illustrates the normal process control of the laser current during this type of operation.

In the case of abnormal conditions, i.e. if (controller status signal 31=FALSE) OR (hardware interlock status signal 28=FALSE), then the ramp generator 21 ramps down the value of ramp generator output signal 32 and therefore ramps down laser current signal 29 (and thus the laser current level and power) to zero level with predefined speed. Region II of the graph shown in FIG. 3 illustrates the failure event and the corresponding ramp down of the laser current output signal 29, and thus the laser current level and/or laser power.

In other words, the ramp generator 21 monitors signals sent from the controller 20 and the hardware protection system 26 to the ramp generator 21, such as controller status signal 31 and hardware interlock status signal 28, to detect signal failure, and ramp down power to the laser 23 upon signal failure detection. Signal failure detection may include detecting missing pulses from the control status signal 31 sent from the controller 20 to the ramp generator 21 or detecting a signal failure from the hardware interlock status signal 28, e.g. hardware interlock status signal 28=FALSE, sent from the hardware protection system 26 to the ramp generator 21.

Figure 4:
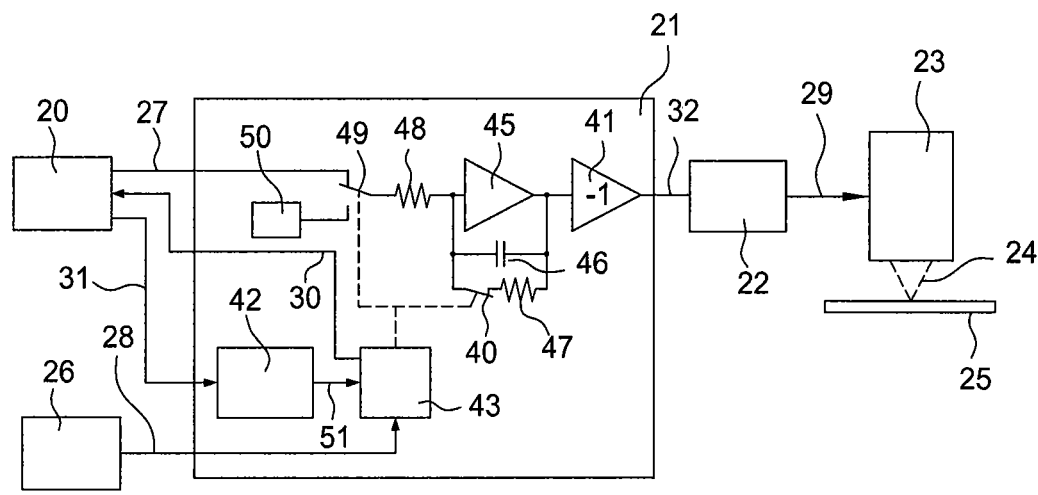
FIG. 4 illustrates a circuit diagram of a laser based annealing system according to an embodiment of the invention.

In order to implement the previously described laser control system, embodiments of the invention may include a system controller 20, a hardware protection system 26, a ramp generator 21, a laser power supply 22, and laser 23, as illustrated in FIG. 4.

To provide high reliability operation of ramp generator 21, a hardware only approach is used. To eliminate any excursion of the ramp generator output signal 32 during switching between normal mode (zone I in FIG. 3), and ramp down mode (zone II in FIG. 3), the ramp generator 21 may include an integrator formed by an operational amplifier 45, a capacitor 46, and a second resistor 48. The integrator is electrically coupleable with the controller 20. The second resistor 48 is electrically coupled in series with the operational amplifier 45, and the capacitor 46 is electrically coupled in parallel with the operational amplifier 45. Inverter 41 restores polarity of laser power control signal (an input signal) 27 inverted by operational amplifier 45. The inverter 41 is electrically coupleable with the laser 23.

The ramp generator 21 may also include a first resistor 47 electrically coupleable in parallel with the integrator, a logical module 43 electrically coupled with the hardware protection system 26 and the controller 20, and a missing pulse detector 42 electrically coupled with the controller 20 and the logical module 43. The ramp generator 21 may also include a voltage reference 50 electrically coupleable with the integrator, a first contact 40 to electrically connect or disconnect the first resistor 47 with the integrator, and a second contact 49 to electrically connect the integrator with the controller 20 or the voltage reference 50. The integrator is electrically coupleable with the controller 20 via a second contact 49, and the logical module 43 controls both the first and second contacts 40 and 49.

At the beginning of laser control and monitoring, controller 20 sends controller status signal 31 to the ramp generator 21, such as to the missing pulse detector 42 that is a component of the ramp generator 21. The controller status signal 31 includes pulses with predefined amplitude and frequency. Missing pulse detector 42 in the ramp generator 21 is looking for and detects missing pulses in the controller status signal 31. If no missing pulses are detected, the missing pulse detector 42 sets the output signal 51 at status TRUE. If hardware interlock status signal 28 sent by hardware protection system 26 also has status TRUE, the logical module 43 executes the following: 1) Send back the ramp generator status signal 30—"operation" or "1", and 2) Connect first resistor 47 in parallel to capacitor 46 with first contact 40. The first contact 40 is controlled by logical module 43. Thus, the first resistor 47 is electrically coupleable in parallel with the integrator via the first contact 40.

Hence, the operational amplifier 45 starts work as an inverting amplifier. Because the value of first and second resistors 47 and 48 is the same, the gain of operational amplifier 45 is minus 1. Inverter 41 restores polarity of the ramp generator output signal 32. The ramp generator output signal 32 is the same as laser power control signal 27 from system controller 20.

Figure 5:
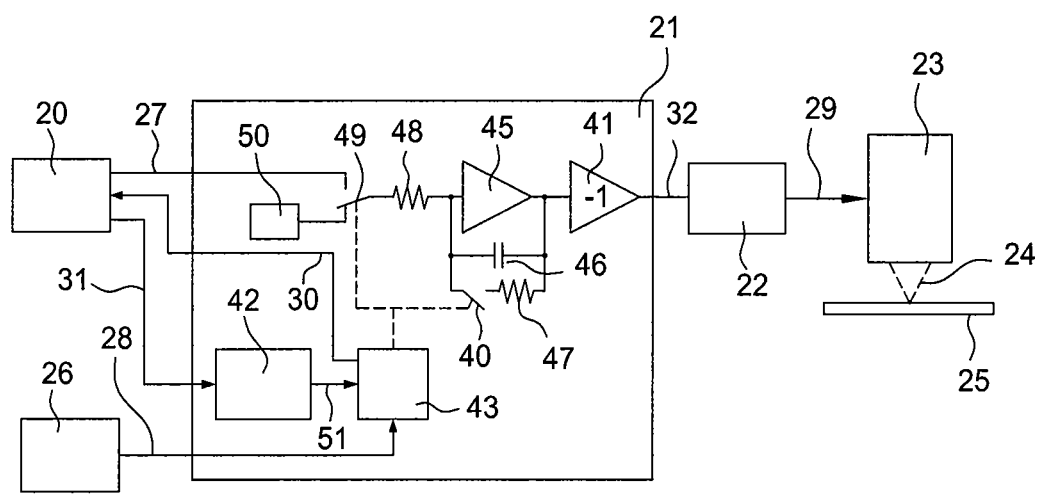
FIG. 5 Illustrates a circuit diagram of a laser based annealing system according to an embodiment of the invention.

If the missing pulse detector 42 detects missing pulses in the controller status signal 31 or if the hardware interlock status signal 28 has value FALSE, denoting a signal failure, the logical module 43 switches first and second contacts 40 and 49, and stops sending back the ramp generator status signal 30, as shown in FIG. 5. Now the first resistor 47 is not connected in parallel to capacitor 46. Operational amplifier 45 works as an integrator. The input of the integrator is disconnected from laser power control signal 27 and connected to voltage reference 50. In other words, the logical module 43 switches the second contact 49 from connecting with the laser power control signal 27 to connecting with the voltage reference 50, while the first contact 40 switches from a closed, connected position to an open, disconnected position. Thus, the voltage reference 50 is electrically coupleable with the integrator.

Voltage reference 50 is inverted with respect to laser power control signal 27 polarity and therefore subtracted from the last value of the laser power control signal 27. Integrator, and therefore ramp generator output signal 32, starts ramping down the laser current and/or power as shown in region II of FIG. 3. To eliminate laser thermal stress due to power off events, laser power supply 22 stores enough energy to ramp down laser current and/or power in case of lost of power.

If other failures occur besides controller failure, the monitoring system will ramp down power and the controller will move components into easy access positions. If controller failure occurs, a straight system shutdown with laser power ramping will follow.

Although embodiments of the invention were described in relation to a substrate annealing system for processing substrates during integrated circuit manufacturing, embodiments of the invention may also be used in other fields that use lasers, such as solid state lasers that work in continuous current mode. Other areas that may use continuous current mode lasers may include, for example, welding or evaporation systems.

While the foregoing is directed to embodiments of the present invention, other and further embodiments of the invention may be devised without departing from the basic scope thereof, and the scope thereof is determined by the claims that follow.

The invention claimed is:

1. A monitoring system, comprising:
a controller to control a laser;
a ramp generator to ramp down power to the laser, the ramp generator electrically coupled with the controller and coupleable with the laser; and
a hardware protection system electrically coupled with the ramp generator, wherein the ramp generator monitors signals sent from the controller and the hardware protection system to the ramp generator to detect signal failure and ramps down power to the laser upon signal failure detection.

2. The monitoring system of claim 1, wherein the signal failure detection comprises detecting missing pulses from a control status signal sent from the controller to the ramp generator or detecting a signal failure from a hardware interlock status signal sent from the hardware protection system to the ramp generator.

3. The monitoring system of claim 1, further comprising:
a laser power supply to supply power to the laser, the laser power supply electrically coupled with the ramp generator and coupleable with the laser, wherein the ramp generator ramps down power to the laser upon detecting the signal failure.

4. The monitoring system of claim 1, wherein the ramp generator further comprises:
an integrator electrically coupleable with the controller;
a first resistor electrically coupleable in parallel with the integrator;
an inverter electrically coupled with the integrator and is electrically coupleable with the laser;
a logical module electrically coupled with the hardware protection system and the controller; and
a missing pulse detector electrically coupled with the controller and the logical module.

5. The monitoring system of claim 4, wherein the ramp generator further comprises:
a voltage reference electrically coupleable with the integrator.

6. The monitoring system of claim 5, wherein the ramp generator further comprises:
a first contact to electrically connect or disconnect the first resistor with the integrator; and
a second contact to electrically connect the integrator with the controller or the voltage reference.

7. The monitoring system of claim 6, wherein the logical module controls the first contact and the second contact.

8. The monitoring system of claim 7, wherein the integrator further comprises:
a second resistor electrically coupled in series with an operational amplifier; and
a capacitor electrically coupled in parallel with the operational amplifier.

9. The monitoring system of claim 8, wherein the first contact is electrically coupled with the capacitor and electrically coupleable with the first resistor, wherein the second contact is electrically coupled with the second resistor.

10. A method to control a laser, comprising:
sending a control status signal from a controller for a laser to a ramp generator;
monitoring the control status signal for missing pulses;
sending a hardware interlock status signal from a hardware protection system to the ramp generator;
monitoring the hardware interlock status signal for signal failure; and
ramping down power to the laser upon detection of missing pulses or signal failure.

11. The method of claim 10, wherein the control status signal comprises a signal with predefined amplitude and frequency.

12. The method of claim 11, wherein the ramp generator further comprises:
an integrator electrically coupleable with the controller;
a first resistor electrically coupleable in parallel with the integrator;
an inverter electrically coupled with the integrator and the laser;
a logical module electrically coupled with the hardware protection system and the controller;
a missing pulse detector electrically coupled with the controller and the logical module; and
a voltage reference electrically coupleable with the integrator.

13. The method of claim 12, wherein sending the control status signal from a controller to a ramp generator comprises sending the control status signal to the missing pulse detector, wherein monitoring the control status signal for missing pulses further comprises detecting missing pulses with the missing pulse detector.

14. The method of claim 12, wherein sending the hardware interlock status signal from hardware protection system to the ramp generator comprises sending the hardware interlock status signal to the logical module; and wherein monitoring hardware interlock status signal for signal failure further comprises detecting signal failure with the logical module.

15. The method of claim 12, wherein ramping down power to the laser upon detection of missing pulses or signal failure comprises ramping down a ramp generator output signal to zero with predefined speed, the ramp generator output signal being sent to a laser power supply to ramp down power to the laser.

16. The method of claim 15, wherein the integrator is connected to the voltage reference upon detection of missing pulses or signal failure.

17. A system to control a laser, the system comprising:
a controller to control a laser;
a ramp generator to ramp down power to the laser, the ramp generator electrically coupled with the controller and the laser;
a hardware protection system electrically coupled with the ramp generator; and,
a laser power supply to supply power to the laser, the laser power supply electrically coupled with the ramp generator and the laser, wherein the ramp generator monitors signals sent from the controller and the hardware protection system to the ramp generator to detect signal failure and ramps down the laser power upon signal failure detection.

18. The system of claim 17, wherein the signal failure comprises missing pulses from a control status signal sent from the controller to the ramp generator or a signal failure from a hardware interlock status signal sent from the hardware protection system to the ramp generator.

19. The system of claim 17, wherein the ramp generator further comprises:
an integrator electrically coupleable with the controller;
a first resistor electrically coupleable in parallel with the integrator;
an inverter electrically coupled with the integrator and the laser;
a logical module electrically coupled with the hardware protection system and the controller;
a missing pulse detector electrically coupled with the controller and the logical module; and
a voltage reference electrically coupleable with the integrator.

20. The monitoring system of claim 19, wherein the ramp generator further comprises:
a first contact to electrically connect or disconnect the first resistor with the integrator; and
a second contact to electrically connect the integrator with the controller or the voltage reference, wherein the logical module controls the first contact and the second contact.

* * * * *

UNITED STATES PATENT AND TRADEMARK OFFICE
CERTIFICATE OF CORRECTION

PATENT NO. : 8,503,497 B2
APPLICATION NO. : 13/323278
DATED : August 6, 2013
INVENTOR(S) : Serebryanov et al.

It is certified that error appears in the above-identified patent and that said Letters Patent is hereby corrected as shown below:

In the Detailed Description:

Column 3, Line 34, please delete "28≠0 True" and insert --28 ≠ True-- therefor;

In the Claims:

Column 6, Claim 14, Line 59, please delete "module; and" and insert --module,-- therefor.

Signed and Sealed this
Fifteenth Day of October, 2013

Teresa Stanek Rea
*Deputy Director of the United States Patent and Trademark Office*